United States Patent
Ikeda et al.

(10) Patent No.: US 8,793,053 B2
(45) Date of Patent: Jul. 29, 2014

(54) VEHICLE PERIPHERY MONITORING DEVICE

(75) Inventors: Keigo Ikeda, Toyota (JP); Takashi Kato, Anjo (JP); Jun Kadowaki, Kariya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/516,128

(22) PCT Filed: Dec. 21, 2010

(86) PCT No.: PCT/JP2010/072973
§ 371 (c)(1),
(2), (4) Date: Jun. 14, 2012

(87) PCT Pub. No.: WO2011/089812
PCT Pub. Date: Jul. 28, 2011

(65) Prior Publication Data
US 2012/0296523 A1    Nov. 22, 2012

(30) Foreign Application Priority Data
Jan. 19, 2010  (JP) ................................ 2010-009246

(51) Int. Cl.
H04N 7/18      (2006.01)
B62D 6/00      (2006.01)
G06F 17/00     (2006.01)

(52) U.S. Cl.
USPC .............................. 701/41; 701/301; 348/148

(58) Field of Classification Search
USPC .................................... 701/41, 301; 348/148
See application file for complete search history.

(56) References Cited

U.S. PATENT DOCUMENTS

2008/0231702 A1*  9/2008  Matsumoto et al. .......... 348/148
2011/0181724 A1   7/2011  Kadowaki et al.

FOREIGN PATENT DOCUMENTS

JP    7-223488 A    8/1995
JP    10-117340 A   5/1998

(Continued)

OTHER PUBLICATIONS

EPO translation to JP 2000-177513A.*

(Continued)

Primary Examiner — Fadey Jabr
Assistant Examiner — Yazan A Soofi
(74) Attorney, Agent, or Firm — Sughrue Mion, PLLC

(57) ABSTRACT

In order to provide a vehicle periphery monitoring device in which excessive information is not displayed on a display device and the driver may intuitively have a sense of distance between their vehicle and an obstacle, the vehicle periphery monitoring device includes an image acquisition unit for obtaining a surrounding image of a vehicle captured by a photographing device mounted on the vehicle, an obstacle detection unit for detecting an obstacle present around the vehicle and its position, a traveling state detection unit for detecting a traveling state of the vehicle, a predicted path line generation unit for generating a predicted path line based on the traveling state of the vehicle detected at the traveling state detection unit, a highlighted display determination unit for determining highlighted display of a partial area including the obstacle of a predicted path area when the obstacle is present within the predicted path area defined by the predicted path line, and a display control unit for superimposing the predicted path line and the highlighted display on the surrounding image and displaying the superimposed image on a monitor device mounted in the interior of the vehicle.

10 Claims, 7 Drawing Sheets

(56) References Cited

FOREIGN PATENT DOCUMENTS

| | | | |
|---|---|---|---|
| JP | 2000-177513 A | | 6/2000 |
| JP | 2000177513 A | * | 6/2000 |
| JP | 2002-29346 A | | 1/2002 |
| JP | 2004-203068 A | | 7/2004 |
| JP | 2004203068 A | * | 7/2004 |
| JP | 2009-40108 A | | 2/2009 |
| JP | 2009-265803 A | | 11/2009 |
| JP | 2009-292457 A | | 12/2009 |
| JP | 2009292457 A | * | 12/2009 |

OTHER PUBLICATIONS

EPO translation to JP 2009-292457A.*
EPO translation to JP 2004-203068A.*
International Search Report for PCT/JP2010/072973 dated Apr. 5, 2011.
English Translation of International Preliminary Report on Patentability for PCT/JP2010/072973 dated Aug. 16, 2012.

* cited by examiner

VEHICLE PERIPHERY MONITORING DEVICE

CROSS REFERENCE TO RELATED APPLICATIONS

This application is a National Stage of International Application No. PCT/JP2010/072973 filed Dec. 21, 2010, claiming priority based on Japanese Patent Application No. 2010-009246 filed Jan. 19, 2010, the contents of all of which are incorporated herein by reference in their entirety.

TECHNICAL FIELD

The present invention relates to a vehicle periphery monitoring device for highlight-displaying an obstacle on a monitor device mounted in the interior of a vehicle for calling the driver's attention.

RELATED ART

A conventional example of this type of device is disclosed in Patent Document 1. This device is designed to extract an obstacle present around a vehicle based on a signal obtained from a photographing device for photographing the surroundings of the vehicle and to display the obstacle on a display device. The way of displaying the obstacle is changed depending on a degree of risk determined by an attribute or a moving direction of the obstacle to allow the driver to recognize a positional relationship between their vehicle and the obstacle or a degree of the risk.

A vehicle peripheral information monitoring device disclosed in Patent Document 2 is designed to display an obstacle detected by vehicle peripheral object detection means on a predetermined schematic pictorial display along with risk-degree information. In this vehicle peripheral information monitoring device, a perspective display level of a basic picture showing the situation around the vehicle representing a background in displaying the obstacle is determined thereby to allow the driver to easily grasp the situation around the vehicle.

RELATED ART DOCUMENT

Patent Document

Patent Document 1: Japanese Unexamined Patent Application Publication No. 2009-40108
Patent Document 2: Japanese Unexamined Patent Application Publication No. 7-223488

SUMMARY OF INVENTION

Technical Problem

Both of Patent Document 1 and Patent Document 2 employ a system for displaying the obstacle affixed with the information relating to the degree of risk. Thus, if plural obstacles are present in a target area, excessive information is displayed on a monitoring screen at once, which may make it difficult for the driver to quickly grasp the situation around the vehicle. Further, since the degree of risk is determined also taking into consideration factors other than the distance between the vehicle and the obstacle such as the attribute or moving direction of the obstacle, the driver may have difficulty in having a sense of distance to the obstacle displayed on the monitoring screen. In addition, it would be difficult for the driver to intuitively determine whether or not the obstacle can be avoided by a steering operation simply by superimposing the obstacle on the surrounding image.

If the driver pays close attention to the monitoring screen excessively in order to obtain a variety of information, they may be distracted from their driving or lose their concentration on their driving, which may enhance the risk of inducing accidents. Therefore, it is not preferable to display excessive information on the monitoring screen. On the other hand, it is necessary to allow the driver to positively have the sense of distance between their vehicle and the obstacle in order to avoid contact between the vehicle and the obstacle. The present invention has been made having regard to the above disadvantages, and its object is to provide the vehicle periphery monitoring device in which information displayed on the monitor device is not excessive to allow the driver to intuitively have the sense of distance between their vehicle and the obstacle.

Solution to Problem

A first characteristic feature of a vehicle periphery monitoring device according to the present invention lies in comprising an image acquisition unit for obtaining a surrounding image of a vehicle captured by a photographing device mounted on the vehicle, an obstacle detection unit for detecting an obstacle present around the vehicle and its position, a traveling state detection unit for detecting a traveling state of the vehicle, a predicted path line generation unit for generating a predicted path line based on the traveling state of the vehicle detected at the traveling state detection unit, a highlighted display determination unit for determining highlighted display of a partial area including the obstacle of a predicted path area when the obstacle is present within the predicted path area defined by the predicted path line, and a display control unit for superimposing the predicted path line and the highlighted display on the surrounding image and displaying the superimposed image on a monitor device mounted in the interior of the vehicle.

With the first characteristic feature, the area that is highlight displayed to include the obstacle is part of the predicted path area defined by the predicted path line, which allows the driver to easily and intuitively have the sense of distance between their vehicle and the obstacle by referring to the predicted path line. Further, the obstacle per se is not highlight displayed individually, but the area including the obstacle is highlight displayed, which can avoid troublesomeness associated with the highlighted display for each obstacle when a number of obstacles are present. Further, when the obstacle is small and difficult to visually confirm on the monitoring screen, the area including the obstacle is highlight displayed and thus the driver may easily recognize the presence of the obstacle.

A second characteristic feature of the present invention lies in that the highlighted display is provided for each of a plurality of partial areas divided from the predicted path area at least in a perspective direction in advance.

With the second characteristic feature, the highlighted display is provided for each of the partial areas divided in the perspective direction, which allows the driver to easily have the sense of distance between their vehicle and the highlight displayed area. Therefore, the driver may easily grasp the distance to the obstacle and easily perform an operation to avoid the obstacle.

A third characteristic feature of the present invention lies in that the display control unit is configured to provide a side surface portion in a side of the predicted path line near the photographing device in display.

With the third characteristic feature, since the predicted path line is expressed in three dimensions, the driver may easily have the sense of distance between their vehicle and the obstacle by referring to the predicted path line.

A fourth characteristic feature of the present invention lies in that the display control unit is configured to provide a shaded portion in the side of the predicted path line near the photographing device in display.

With the fourth characteristic feature, since the predicted path line is expressed in three dimensions, the driver may easily have the sense of distance between their vehicle and the obstacle by referring to the predicted path line.

A fifth characteristic feature of the present invention lies in that the highlighted display is provided by coloring in the partial area.

When the highlighted display is provided by coloring in the partial area as in the fifth characteristic feature, the driver may easily recognize the highlighted display, which can reduce the risk of missing the obstacle.

A sixth characteristic feature of the present invention lies in that the colored-in partial area is semitransparent.

When the colored-in partial area is semitransparent as in the sixth characteristic feature, the surrounding image representing the background of the highlighted display may also be seen through. Thus, it is possible to recognize the obstacle that is actually present on the display device in addition to the highlighted display. As a result, the driver may easily grasp the positional relationship between their vehicle and the obstacle and easily perform the operation for avoiding the obstacle.

A seventh characteristic feature of the present invention lies in that a color used in coloring in the partial area is changed depending on a distance between the vehicle and the obstacle.

With the seventh characteristic feature, the driver may easily intuitively have the sense of distance between their vehicle an the obstacle if red bearing a cautionary implication is used for the partial area positioned closer to the vehicle, while green or blue is used for the partial area positioned further from the vehicle, for example.

A eighth characteristic feature of the present invention lies in that the predicted path line is linked to steering of a steering wheel.

With the eighth characteristic feature, the predicted path area defined by the predicted path line is also linked to the steering of the steering wheel. Thus, even when another obstacle is included in the predicted path area by steering the steering wheel, the partial area including the obstacle is highlight displayed to allow the driver to easily recognize the presence of the new obstacle. Further, the predicted path area is moved in response to the steering of the steering wheel, which facilitates the operation for avoiding the obstacle.

A ninth characteristic feature of the present invention lies in that the device is configured to highlight-display the obstacle relatively approaching the predicted path area.

With the ninth characteristic feature, the driver may easily recognize the presence of the obstacle when the obstacle is relatively approaching the predicted path area in response to the operation of the vehicle or the movement of the obstacle, as a result of which the obstacle may easily be avoided.

MODE FOR CARRYING OUT THE INVENTION

An embodiment of a vehicle periphery monitoring device according to the present invention will be described hereinafter in reference to FIGS. 1 to 6.

Figure 1:
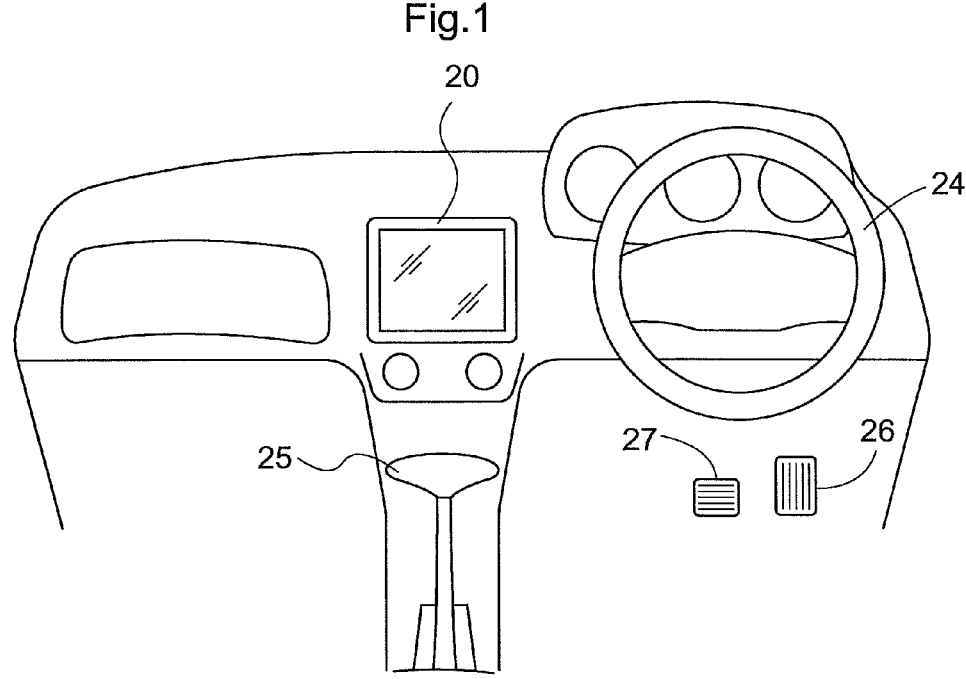
FIG. 1 is a schematic view showing the vicinity of a driver's seat of a vehicle.
Figure 2:
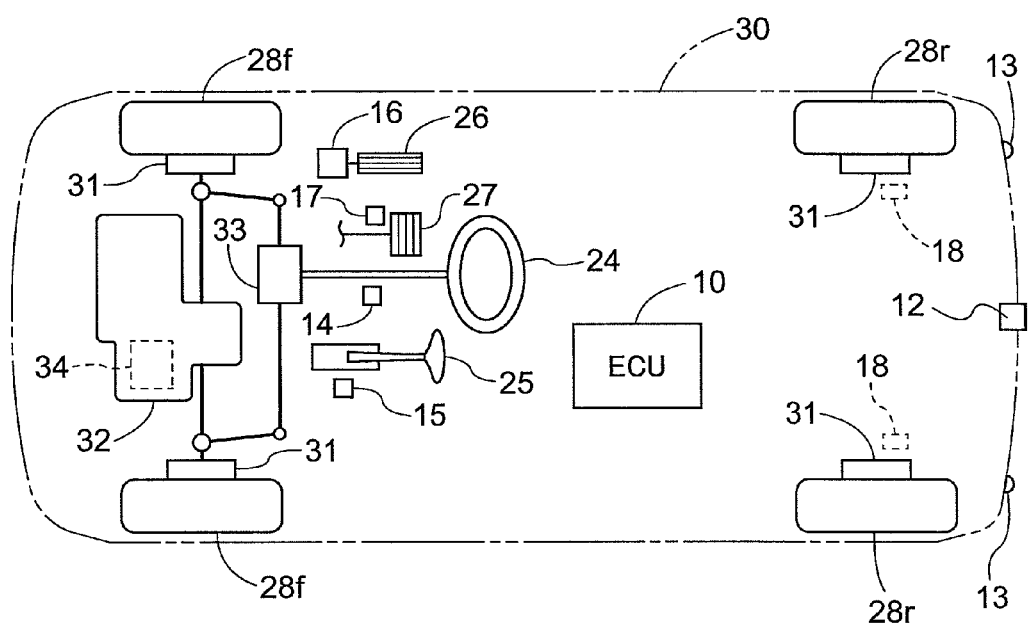
FIG. 2 is a schematic view showing a principal portion of the vehicle.

FIGS. 1 and 2 show a basic construction of a vehicle 30 equipped with the vehicle periphery monitoring device according to the current embodiment. A steering wheel 24 provided in a driver's seat is linked to a power steering unit 33 for transmitting a rotational operational force to front wheels 28f to steer the vehicle 30. Forwardly of the vehicle 30 are arranged an engine 32 and a speed change mechanism 34 for changing drive power from the engine 32 for transmission to the front wheels 28f and rear wheels 28r. The drive power is transmitted to either or both of the front wheels 28f and rear wheels 28r depending on a driving system (front-wheel drive, rear-wheel drive or four-wheel drive) of the vehicle 30.

An acceleration pedal 26 for controlling running speed and a brake pedal 27 for applying a braking force to the front wheels 28f and rear wheels 28r through a brake unit 31 are juxtaposed with each other in the vicinity of the driver's seat. A monitor 20 (display device) is mounted on a portion above a console provided adjacent to the driver's seat. If the vehicle 30 is provided with a parking assist system or a car navigation system, the monitor 20 may be used as the display device for those systems as well.

An operational system for the steering wheel 24 includes a steering sensor 14 for measuring a steering direction and an operational amount of the steering wheel 24. An operational system for a shift lever 25 includes a shift position sensor 15 for detecting a shift position. Further, an acceleration sensor 16 is provided in an operational system for the acceleration pedal 26 and a brake sensor 17 is provided in an operational system for the brake pedal 27, respectively, for measuring an operational amount of the pedal. Moreover, a wheel speed sensor 18 is provided in the vicinity of each of the rear wheels 28r for measuring a rotational amount of the rear wheels 28r. It should be noted that the arrangements of those sensors are not limited to the above arrangements, but may be any other arrangements as long as substantially the same measurements are obtained.

A camera 12 (photographing device) is provided in a central part of a rear portion of the vehicle 30 for capturing a surrounding image rearwardly of the vehicle 30. The surrounding image captured by the camera 12 is displayed on the monitor 20. A sonar 13 is provided in each of lateral opposite ends of the rear portion of the vehicle 30 for detecting an obstacle that is present rearwardly of the vehicle and measuring a distance between the vehicle and the obstacle. Further, the vehicle 30 is equipped with an ECU (electronic control unit) 10 acting as a core of the vehicle periphery monitoring device of the present invention.

Figure 3:
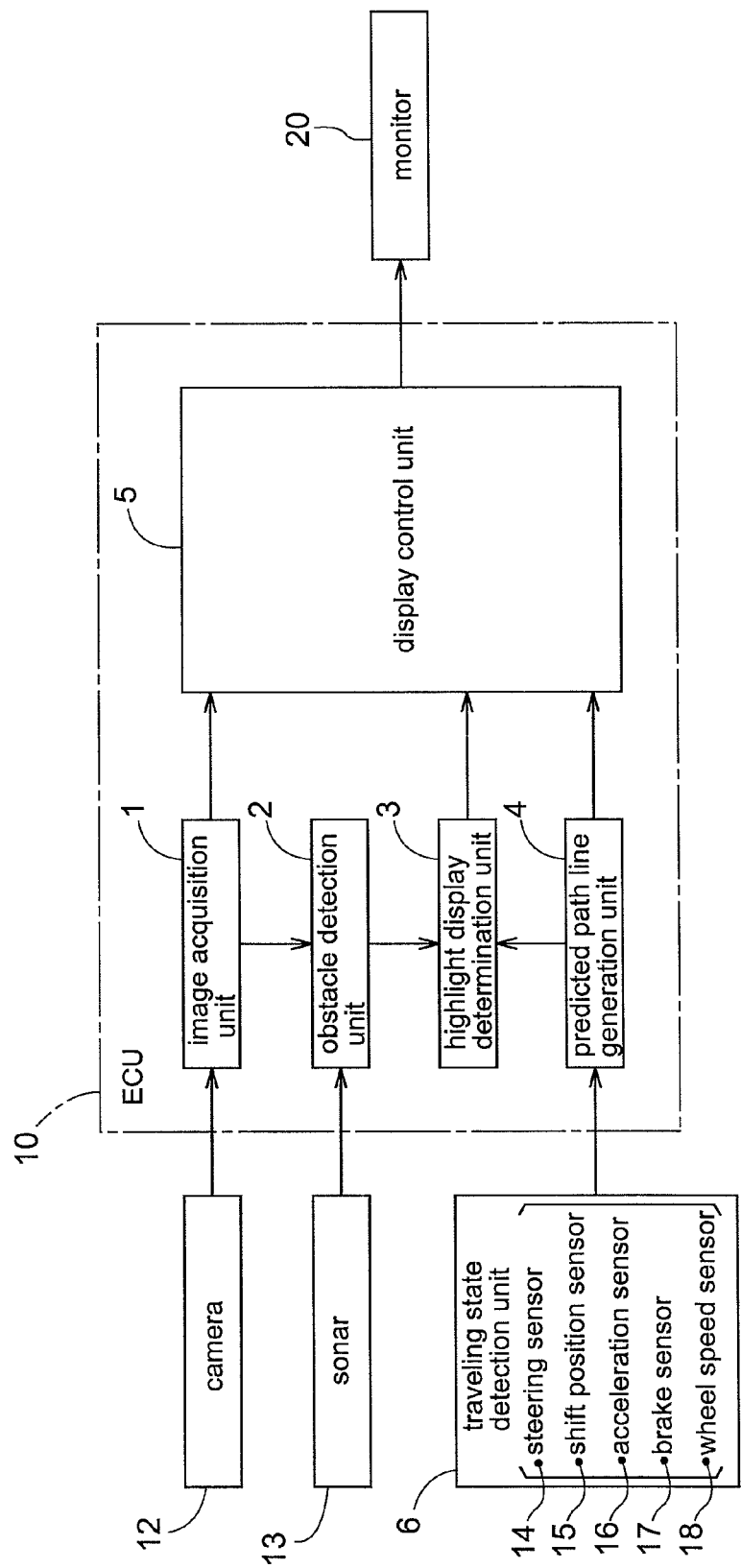
FIG. 3 is a block diagram showing a structure of a vehicle periphery monitoring device according to the present invention.

FIG. 3 is a block diagram showing a structure of the vehicle periphery monitoring device according to the present invention. The ECU 10 includes an image acquisition unit 1, an obstacle detection unit 2, a highlighted display determination unit 3, a predicted path line generation unit 4 and a display control unit 5. A function of each functional unit provided in the ECU 10 is achieved by cooperation between hardware of a microprocessor and software of a program, for example. Each functional unit is shown as sharing the functions and is not necessarily independent physically.

A traveling state detection unit 6 is a functional unit for detecting a traveling state such as a speed or traveling direction of the vehicle 30, and includes the steering sensor 14, shift position sensor 15, acceleration sensor 16, brake sensor 17 and wheel speed sensor 18. The arrangement of the traveling state detection unit 6 is not limited to the above arrangement, but may have part of the above sensors or may have any other sensor.

The image acquisition unit 1 is a functional unit for obtaining the surrounding image of the vehicle 30 captured by the camera 12. The obstacle detection unit 2 is a functional unit for detecting an obstacle present around the vehicle 30 and its position based on the surrounding image obtained at the image acquisition unit 1 and a signal from the sonar 13. It should be noted that it is not necessarily required to use both of the surrounding image obtained at the image acquisition unit 1 and the signal from the sonar 13, but only one of them may be used in detecting the obstacle and its position at the obstacle detection unit 2.

The predicted path line generation unit 4 is a functional unit for generating a locus (referred to as "predicted path line" hereinafter) of the vehicle 30 predictable from the traveling state detected at the traveling state detection unit 6. The highlighted display determination unit 3 is a functional unit for highlight-displaying part of a predicted path area including the obstacle defined by the predicted path line generated at the predicted path line generation unit 4 when the position of the obstacle detected at the obstacle detection unit 2 is included in the predicted path area. The predicted path line, predicted path area and highlighted display will be described later.

The display control unit 5 is a functional unit for superimposing the surrounding image of the vehicle 30 obtained at the image acquisition unit 1, the predicted path line generated at the predicted path line generation unit 4 and the highlighted display determined at the highlighted display determination unit 3 and for displaying the superimposed image on the monitor 20 mounted in the interior of the vehicle.

Figure 4:
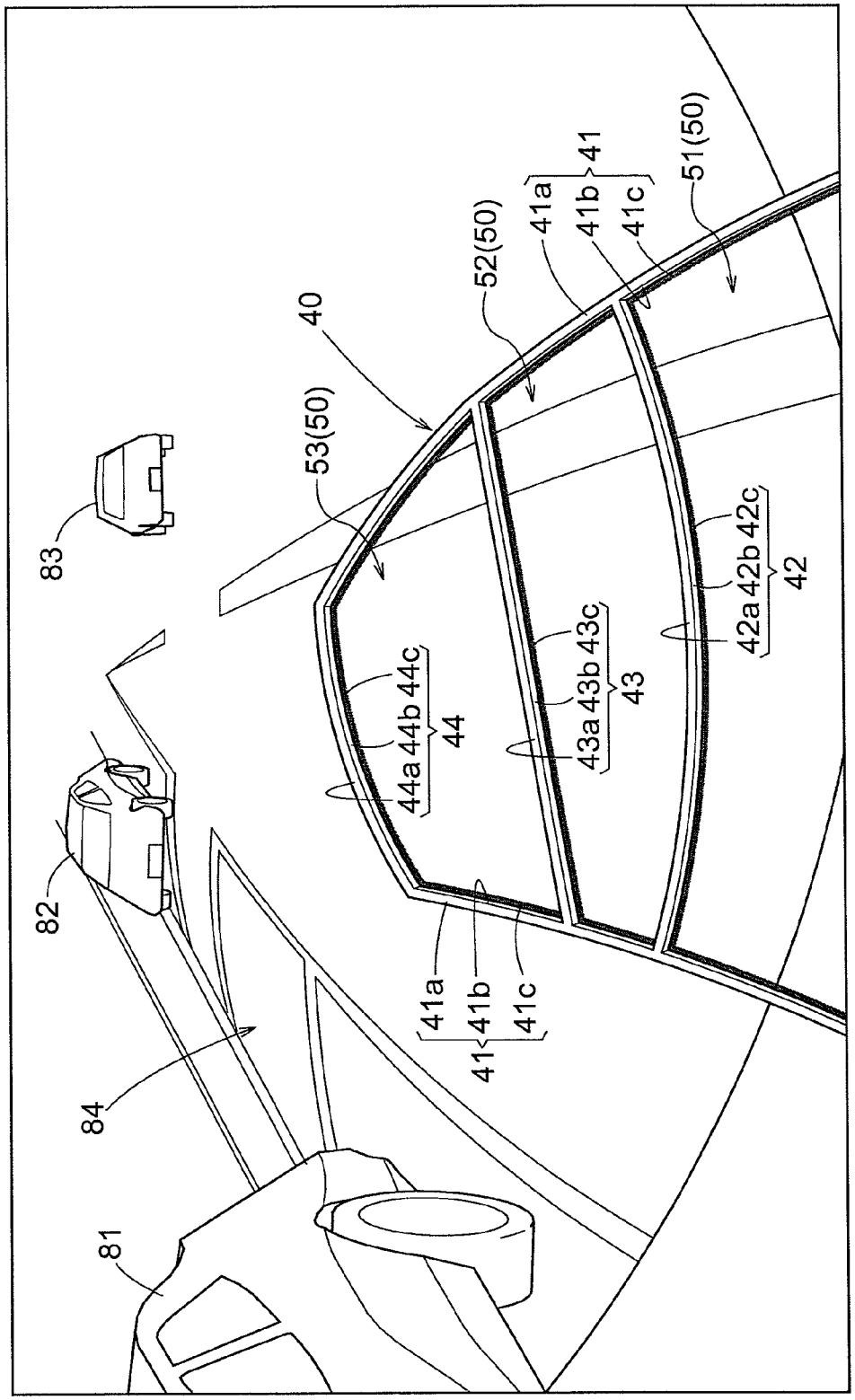
FIG. 4 shows an example of a surrounding image and a predicted path line displayed on a monitor.

FIG. 4 shows an example of the surrounding image and the predicted path line 40 displayed on the monitor 20. In the current embodiment, it is assumed that the vehicle 30 is driven backward and parallel parked in a parking space 84 between parked vehicles 81 and 82. A running vehicle 83 is a vehicle running in the opposite lane. Such an image is used not only for the vehicle periphery monitoring device of the present invention but also for the parking assist system as well.

The predicted path line 40 consists of a right and left pair of predicted locus lines 41 each showing a predicted locus of the vehicle 30 and distance mark lines 42, 43 and 44. In the current embodiment, the distance mark lines 42, 43 and 44 indicate positions of 0.5 m, 1.0 m and 2.2 m from a rear end of the vehicle 30, respectively. The predicted path line 40 is depicted in yellow basically, while the distance mark line 42 and part of the predicted locus line 41 positioned nearer to the vehicle 30 than the mark line 42 are displayed in red in order to call the driver's attention. It should be noted that the color of the predicted path line 40 and the number or positions of the distant mark lines are not limited to the above example. Further, the predicted path line 40 may be shown in dotted line, dashed line or chain line, instead of solid line.

The predicted locus line 41 consists of a main line portion 41a, a side surface portion 41b and a shaded portion 41c. The side surface portion 41b and shaded portion 41c are provided inwardly of the main line portion 41a in a width direction of the vehicle. Similarly, each of the distance mark lines 42, 43 and 44 consists of a main line portion 42a, 43a or 44a, a side surface portion 42b, 43b or 44b and a shaded portion 42c, 43c or 44c provided adjacent to the vehicle 30. The predicted path line 40 is displayed in three dimensions by providing the side surface portions 41b, 42b, 43b and 44b and the shaded portions 41c, 42c, 43c and 44c in this way, which allows the driver to easily and intuitively have a sense of distance to the obstacle.

The predicted path line 40 varies in response to the traveling state detected at the traveling state detection unit 6. For example, when the steering wheel 24 is steered, the predicted path line 40 is correspondingly moved sideways on the monitor 20. An area contoured by the right and left locus lines 41 and the distant mark line 44 positioned farthest from the vehicle 30 of the predicted path line 40 is defined as the predicted path area 50. When the obstacle is present in the predicted path area 50, part of the area including the obstacle is highlight displayed. In the current embodiment, it is determined whether or not the predicted path area 50 divided into three partial areas 51, 52 or 53 by the distance mark lines 42 and 43 in a perspective direction is highlight displayed in each partial area.

Figure 5:
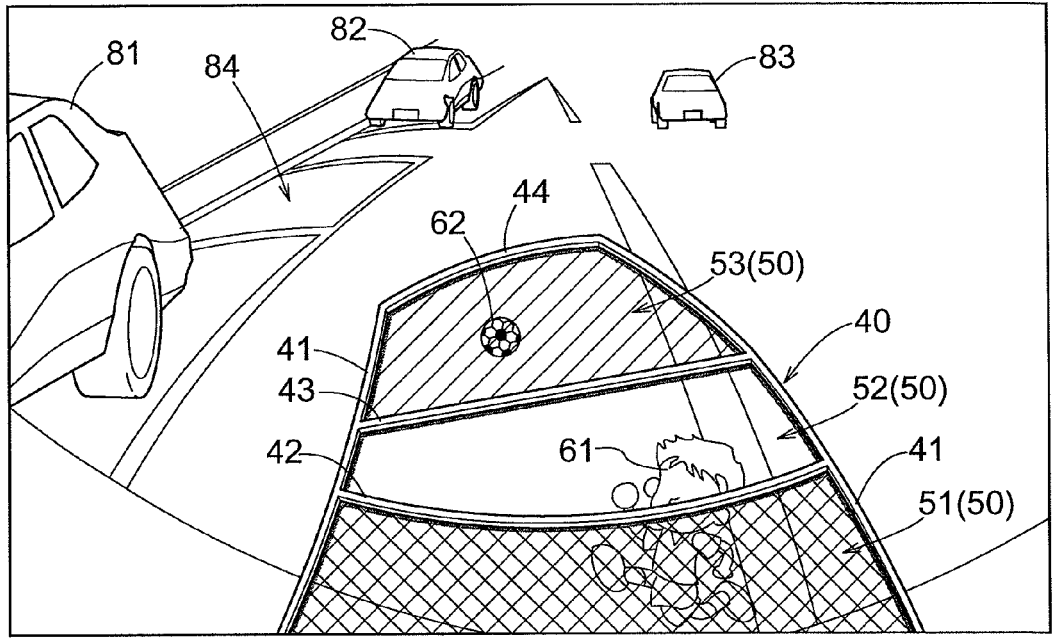
FIG. 5 shows an example of highlighted display.
Figure 6:
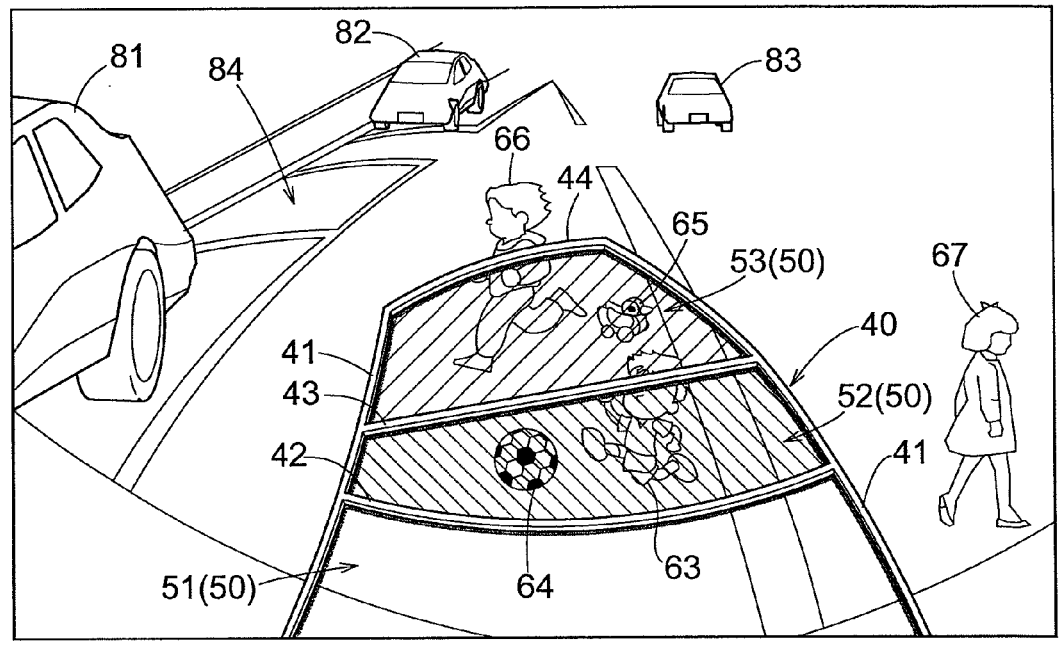
FIG. 6 shows another example of the highlighted display.

FIGS. 5 and 6 each show an example of the highlighted display of the current embodiment. In the following description, the term "obstacle" includes a person. As shown in FIG. 5, when an obstacle 61 is present in the partial area 51 and an obstacle 62 is present in the partial area 53, the partial areas 51 and 53 are highlight displayed. Here, the highlighted display is provided by coloring in the partial area 51 with semitransparent red and coloring in the partial area 53 with semitransparent green. Similarly, in an example shown in FIG. 6, the highlighted display is provided by coloring in the partial area 52 including obstacles 63 and 64 with semitransparent yellow and coloring in the partial area 53 including obstacles 65 and 66 with semitransparent green. The highlighted display is not provided in relation to an obstacle 67 since it is present in the outside of the predicted path area 50.

Since each of the partial areas 51, 52 and 53 to be highlight displayed is part of the predicted path area 50 defined by the predicted path line 40, the driver may easily and intuitively have the sense of distance between their vehicle and the obstacle when referring to the predicted path line 40. Further, the predicted path line 40 displayed on the monitor 20 is linked to steering of the steering wheel 24, as a result of which the driver may easily determine whether or not the obstacle can be avoided by steering the steering wheel 24.

When a relatively small obstacle such as an obstacle 62 shown in FIG. 5 is present, there is a possibility of missing the obstacle 62 on the monitor 20 even if the obstacle 62 per se is highlight displayed. In contrast, when the partial area 53 including the obstacle 62 is highlight displayed, the possibility of missing the obstacle is drastically reduced. Further, as shown in FIG. 6, when a number of obstacles are present, the sight becomes offensive to the eye if the highlighted display is provided for each obstacle, while such an offensive sight can be avoided if the highlighted display is provided for each partial area including the obstacle thereby to allow the driver to easily have the sense of distance between their vehicle and the obstacle.

When the highlighted display is provided by coloring in the partial area in which the obstacle is present as in the current embodiment, a range to be highlight displayed becomes broader than the case for highlight-displaying the obstacle per se. As a result, the driver may easily recognize the presence of the obstacle on the monitor 20. Further, when the partial area 51 positioned nearest to the vehicle 30 is colored in red bearing a cautionary implication, the partial area 53 positioned farthest from the vehicle 30 is colored in green bearing a less cautionary implication, and the intermediate partial area 52 is colored in yellow as the above, the driver can intuitively have the sense of distance between their vehicle and the obstacle more easily. Further, since the surrounding image obtained at the image acquisition unit 1 is also displayed on the monitor 20, such a surrounding image is visible as a background of the colored area if the colored-in area is semitransparent. Consequently, the driver can recognize any obstacle present reflected in the surrounding image and easily perform an operation to avoid the obstacle.

With the vehicle 30 having the parking assist system, the predicted path line 40 may also act as a guide line displayed for parking assist. Using the predicted path line 40 versatilely in this manner enables the driver to become familiar with the predicted path line 40 and easily have the sense of distance in the highlight-displayed area in reference to the predicted path line 40.

Modified Embodiments

Modified embodiments of the vehicle periphery monitoring device according to the present invention will be described hereinafter in reference to FIGS. 7 to 11.

Figure 7:
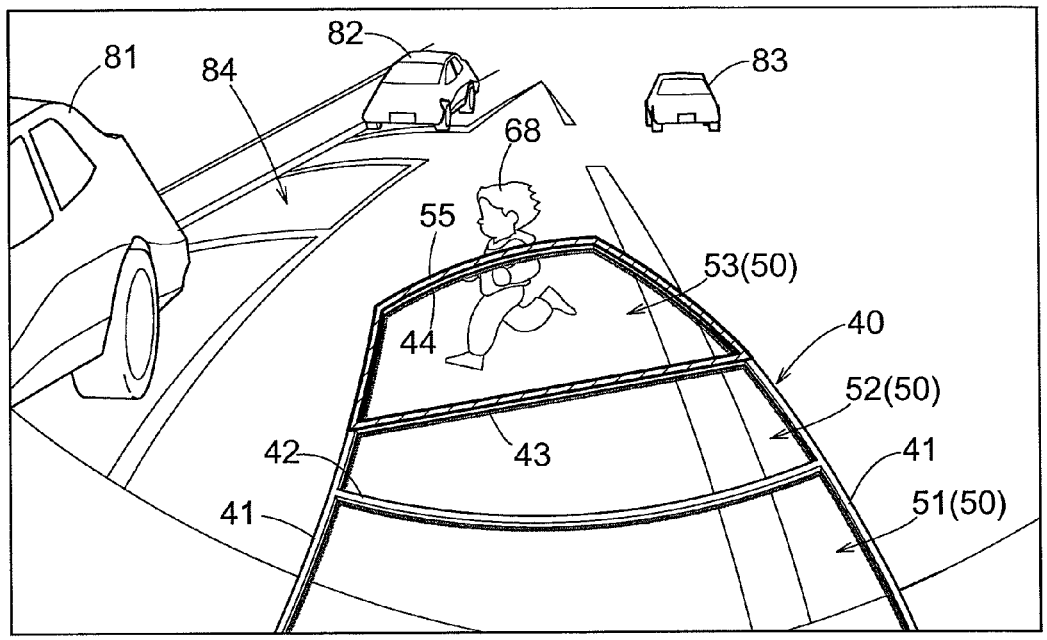
FIG. 7 shows an example of the highlighted display in another modified embodiment.

FIG. 7 shows an example in which a contour 55 of the partial area 53 in which an obstacle 68 is present is highlight displayed. The contour 55 consists of the distance mark lines 43 and 44 and part of the predicted locus line 41 extending between those distance mark lines. In this case, it is suggested to color the contour 55 with a specific color, flash the contour 55 on and off or display the contour 55 in bold line, for example, as the way of highlighted display. The highlighted display of the contour 55 of the partial area 53 in this manner allows the driver to easily view the surrounding image forming the background and easily recognize the actual obstacle.

Figure 8:
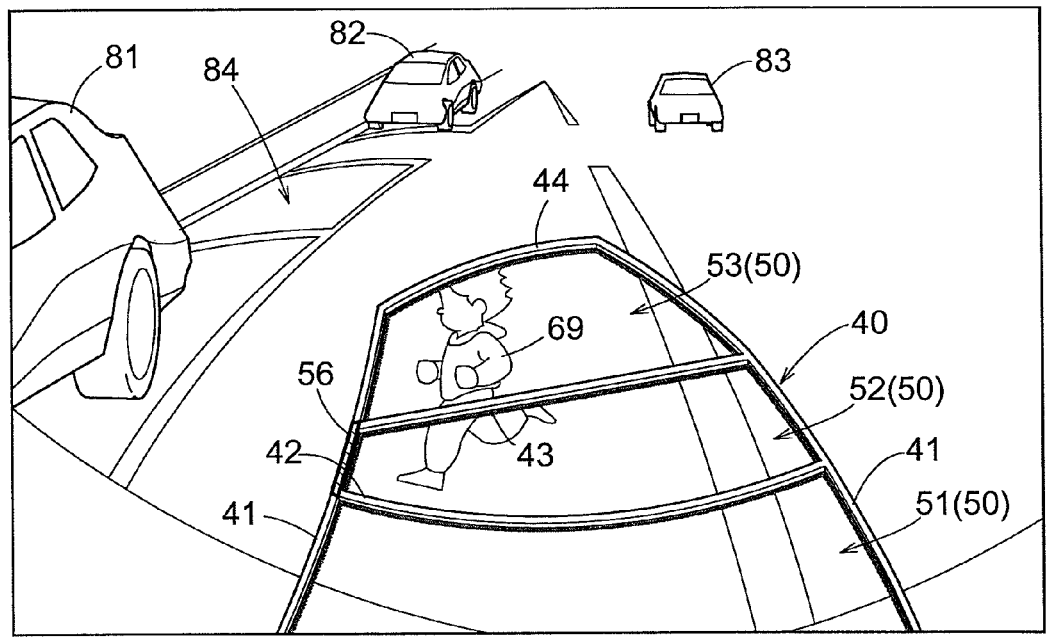
FIG. 8 shows an example of the highlighted display in a further modified embodiment.

Provided the predicted path line 40 is also included in the predicted path area 50, it is possible to highlight-display a sectional area 56 of the predicted path line 40 as shown in FIG. 8. The sectional area 56 represents part of the predicted locus line 41 forming the partial area 52 including an obstacle 69, the part being positioned near the obstacle 69 (left side in FIG. 8 in the current example). Such highlighted display allows the driver to not only intuitively recognize the position of the obstacle 69 in the perspective direction but also intuitively recognize the position in the width direction of the vehicle. In this case, it is suggested to color in the sectional area 56 with a specific color, flash the sectional area 56 on and off or display the sectional area 56 in bold line, for example, as the way of highlighted display.

Figure 9:
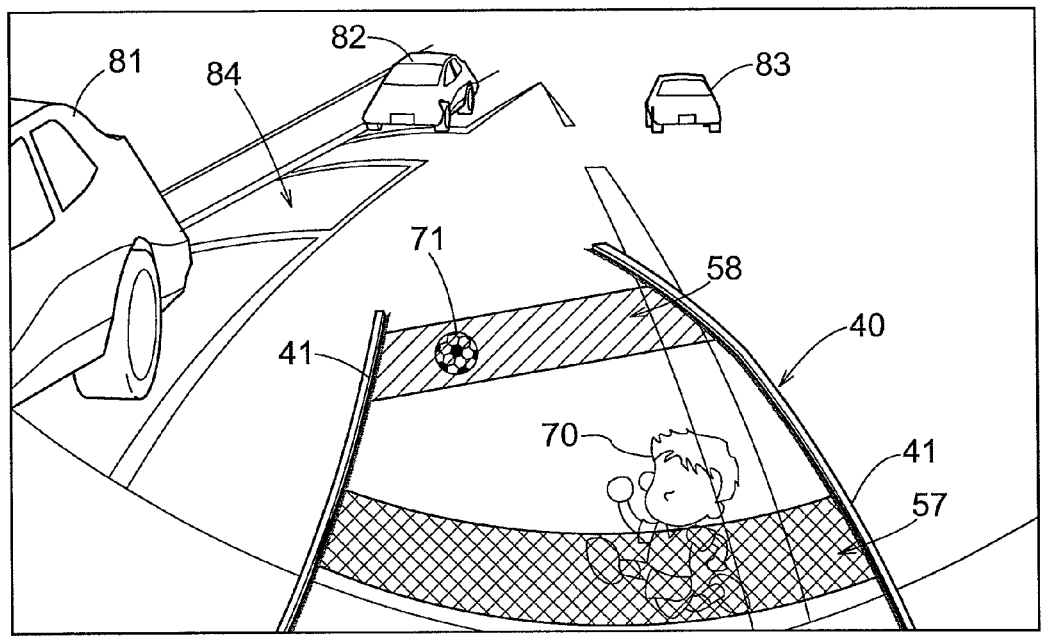
FIG. 9 shows an example of the highlighted display in a further modified embodiment.

FIG. 9 shows an example in which the predicted path line 40 has no distance mark line and only has the predicted locus line 41. In this case, it is suggested to highlight-display zonal areas 57 and 58 each having a width corresponding to a predetermined distance in the perspective direction from the position of an obstacle 70 or 71 detected at the obstacle detection unit 2, for example. While the zonal areas 57 and 58 are colored in to provide the highlighted display here, the contours of those areas 57 and 58 may be highlight displayed.

Figure 10:
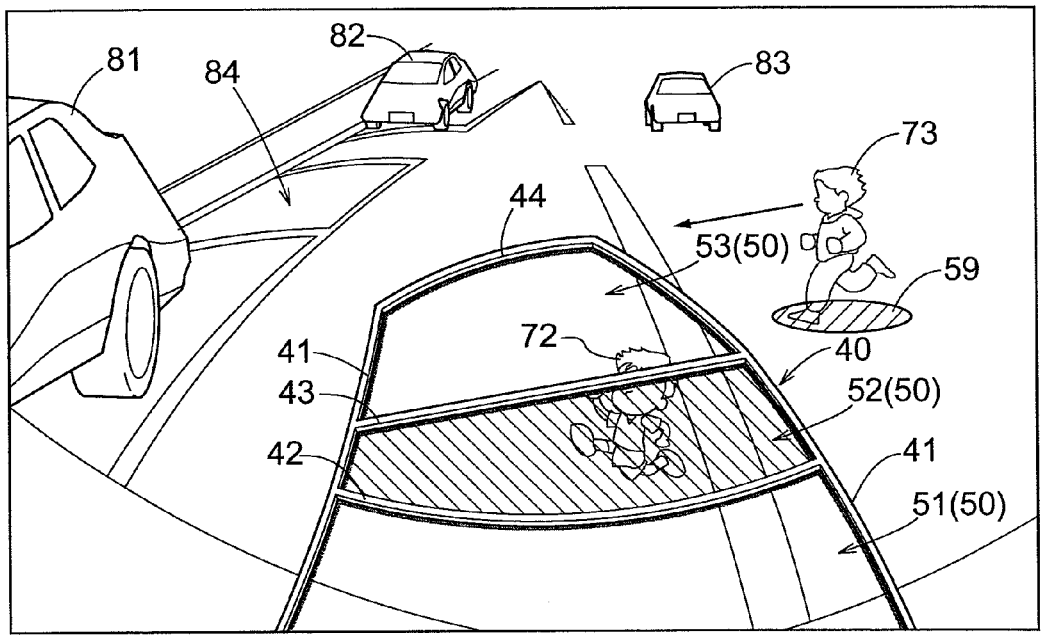
FIG. 10 shows an example of the highlighted display in a further modified embodiment.
Figure 11:
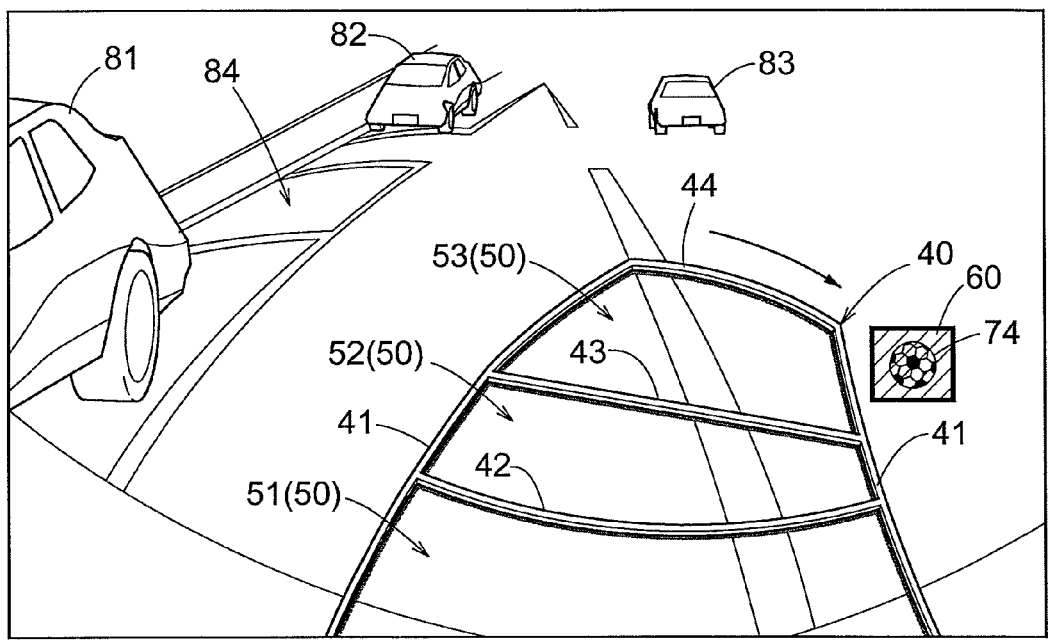
FIG. 11 shows an example of the highlighted display in a further modified embodiment.

FIG. 10 shows an example in which, in addition to the highlighted display of the partial area 52 in which an obstacle 72 is present, an obstacle 73 approaching the predicted path area 50 is highlight displayed with a colored-in portion 59. FIG. 11 shows an example in which, when the predicted path line 40, that is, the predicted path area 50 is turned to the right in response to steering of the steering wheel 24 rightward to make the predicted path area 50 approach a still obstacle 74, the obstacle 74 is highlight displayed with a colored-in portion 60. With the highlighted display for the obstacles 73 and 74 provided at the stage in which the relative distance between the vehicle 30 and the obstacles 73 and 74 is shrinking as noted above, the driver may easily recognize the presence of the obstacles 73 and 74 and easily avoid the obstacles 73 and 74. It should be noted that the highlighted display of the obstacles 73 and 74 is not limited to coloring in the obstacle, but may be provided through any other way such as framing the obstacle.

Alternatively, in coloring in the target area in each of the above embodiments, the contour of the obstacle may be detected through image processing, for example, so as not to color in the inside of the contour. It is also possible to frame the obstacle as shown in FIG. 11 but without coloring in the inside of the frame. Additionally, the predicted path line 40 may not be displayed in part in the inside of the contour or frame noted above. Those arrangements make it more easily for the driver to recognize the obstacle on the monitor 20.

As other modifications, the predicted path area 50 may be divided in the lateral direction (width direction of the vehicle), or the predicted path line 40 may not necessarily be linked to the steering of the steering wheel 24, but may be fixed in position at a certain point. It is also possible to provide the vehicle periphery monitoring device for allowing the driver to intuitively have the sense of distance between the vehicle 30 and the obstacle that is present forwardly of the vehicle 30 with the camera 12 and sonar 13 being mounted on the front side of the vehicle 30. Further, it is possible to provide the vehicle periphery monitoring device for allowing the driver to intuitively have the sense of distance between the vehicle 30 and the obstacle that is present on a lateral side of the vehicle 30 with the camera 12 and sonar 13 being mounted on at least one of the lateral sides of the vehicle 30.

When the obstacle is included in the predicted path area 50, it is also possible to give a warning beep through a speaker provided in the interior of the vehicle or generate vibration on the steering wheel 24, in addition to the visual highlighted display. In that case, it is preferable that the warning beep or the vibration on the steering wheel 24 is varied in stages to allow the driver to intuitively have the sense of distance to the obstacle.

INDUSTRIAL USABILITY

The present invention is applicable to a vehicle periphery monitoring device for highlight-displaying an obstacle on a monitor device mounted in the interior of a vehicle to call the driver's attention.

DESCRIPTION OF REFERENCE SIGNS 1 image acquisition unit
2 obstacle detection unit 3 highlighted display determination unit
4 predicted path line generation unit
5 display control unit
6 traveling state detection unit
12 camera (photographing device)
20 monitor (display device)
30 vehicle
40 predicted path line
50 predicted path area
51, 52, 53 partial area (divided from the predicted path area in the perspective direction)

The invention claimed is:

1. A vehicle periphery monitoring device comprising:
an image acquirer for obtaining a surrounding image of a vehicle captured by a photographing device mounted on the vehicle;
an obstacle detector for detecting an obstacle present around the vehicle and its position;
a traveling state detector for detecting a traveling state of the vehicle;
a predicted path line generator for generating a predicted path line based on the traveling state of the vehicle detected at the traveling state detector;
a highlighted display determiner for determining, when the obstacle is present within a predicted path area defined by the predicted path line, highlighted display of an entire area including the obstacle and divided from the predicted path area in a perspective direction in advance of the obstacle detector detecting the obstacle; and
a display controller for superimposing the predicted path line and the highlighted display on the surrounding image and displaying the superimposed image on a monitor device mounted in the interior of the vehicle.

2. The vehicle periphery monitoring device claimed in claim 1, wherein the display controller is configured to provide a side surface portion in a side of the predicted path line near the photographing device in display.

3. The vehicle periphery monitoring device claimed in claim 1, wherein the display controller is configured to provide a shaded portion in the side of the predicted path line near the photographing device in display.

4. The vehicle periphery monitoring device claimed in claim 1, wherein the highlighted display is provided by coloring in the partial area.

5. The vehicle periphery monitoring device claimed in claim 4, wherein the colored-in partial area is semitransparent.

6. The vehicle periphery monitoring device claimed in claim 4, wherein a color used in coloring in the partial area is changed depending on a distance between the vehicle and the obstacle.

7. The vehicle periphery monitoring device claimed in claim 1, wherein the predicted path line is linked to steering of a steering wheel.

8. The vehicle periphery monitoring device claimed in claim 7 for highlight-displaying the obstacle relatively approaching the predicted path area.

9. The vehicle periphery monitoring device claimed in claim 1, wherein the highlighted display determiner determines the entire area from among a plurality of areas divided from the predicted path area in the perspective direction in advance of the obstacle detector detecting the obstacle.

10. The vehicle periphery monitoring device claimed in claim 9, wherein when the obstacle detector detects a first obstacle within a first area, from among the plurality of areas, and a second obstacle within a second area, from among the plurality of areas, the highlighted display determiner determines to highlight both the first area and the second area.

* * * * *